May 29, 1928.
G. B. GALLASCH
MEASURING INSTRUMENT
Filed May 29, 1926
1,671,709
2 Sheets-Sheet 1
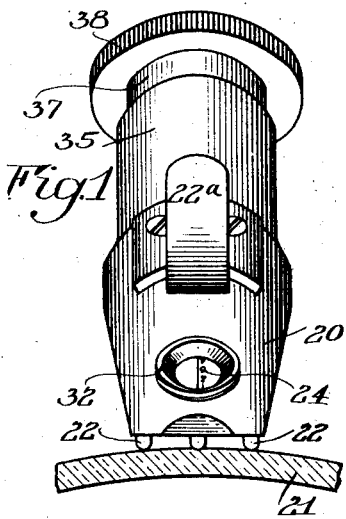
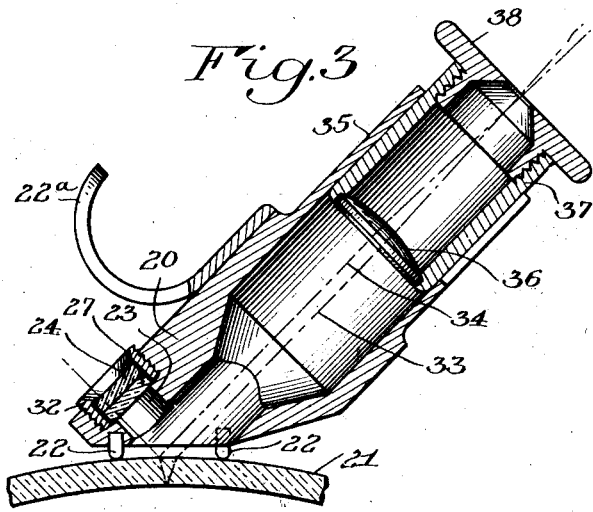
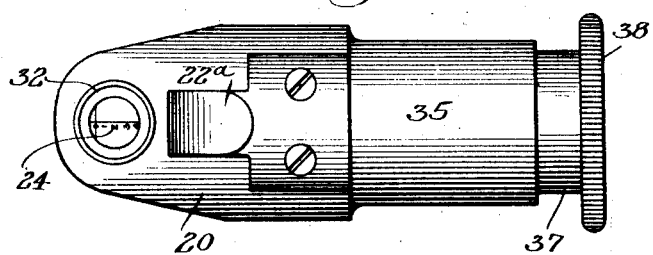
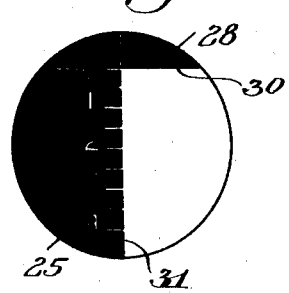
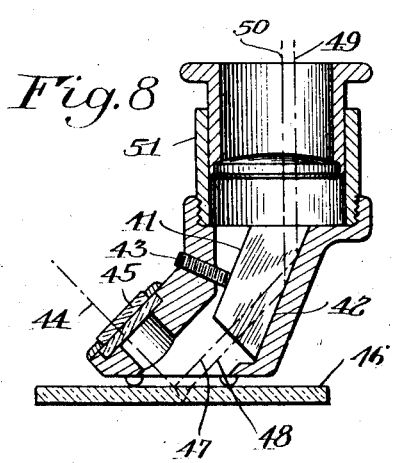
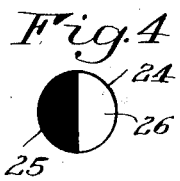
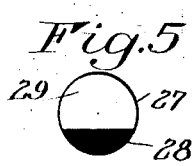
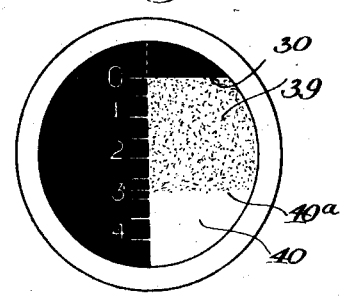
INVENTOR
George B. Gallasch
BY
his ATTORNEYS May 29, 1928.
G. B. GALLASCH
1,671,709
MEASURING INSTRUMENT
Filed May 29, 1926
2 Sheets-Sheet 2
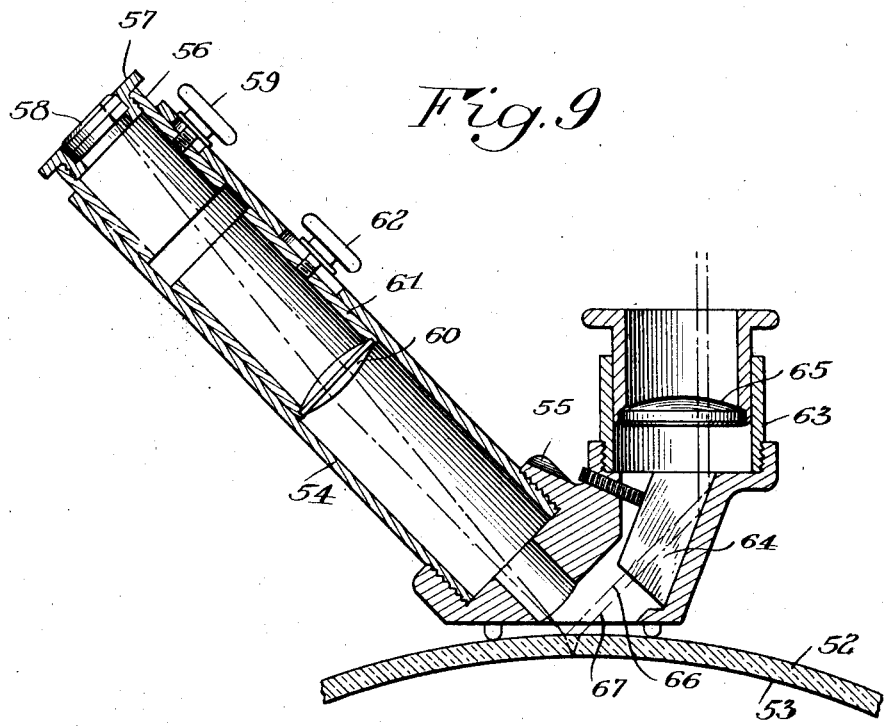
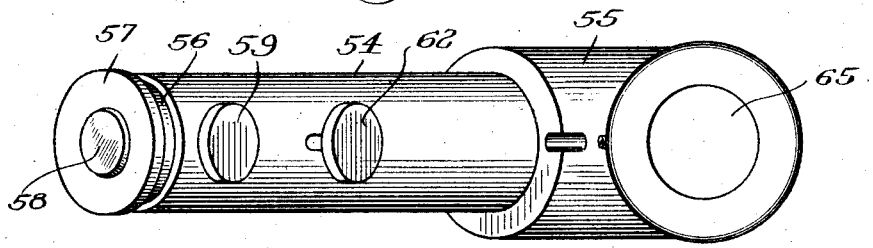
INVENTOR
George B. Gallasch
BY
his ATTORNEYS Patented May 29, 1928.

1,671,709

UNITED STATES PATENT OFFICE.

GEORGE B. GALLASCH, OF ROCHESTER, NEW YORK, ASSIGNOR TO BAUSCH & LOMB OPTICAL COMPANY, OF ROCHESTER, NEW YORK, A CORPORATION OF NEW YORK.

MEASURING INSTRUMENT.

Application filed May 29, 1926. Serial No. 112,528.

This invention relates to measuring instruments and more particularly to those of an optical variety, one object of the invention being to provide an efficient instrument of this nature for measuring the distance between spaced optical surfaces of a body. Another object is the provision of a simple, practical and convenient instrument of this character employing optical effects for measuring the thickness of a body of transparent material, as for instance, a body or plate of glass difficult to measure by ordinary methods such for example, as the wall of a closed electric light bulb.

Another object is the provision of such an instrument of a direct reading variety by means of which, for example, the observed position of a reference mark relative to a scale indicates directly the thickness of the material being measured. A further object is the provision of an instrument of this variety of a simple, convenient and self contained form adapted to be applied in the hand as a unit to a body to be measured, and capable of being rapidly used and read by an unskilled operator in practical manufacturing operations.

To these and other ends the invention resides in certain improvements and combination of parts, all as will be hereinafter more fully described, the novel features being pointed out in the claims at the end of the specification.

In the drawings:

Fig. 1 is a front elevation of an instrument embodying the present invention;

Fig. 2 is a top plan view of the same;

Fig. 3 is a longitudinal sectional view of the same;

Figs. 4 and 5 are views of diaphragm parts of the instrument detached;

Fig. 6 is an enlarged view of the parts of Figs. 4 and 5 assembled;

Fig. 7 represents a view through the eyepiece of the instrument in use;

Fig. 8 is a sectional elevation of another form of the instrument;

Fig. 9 is a similar view of a still different form; and

Fig. 10 is a top plan view of the instrument shown in Fig. 9.

Similar reference numerals throughout the several views indicate the same parts.

The invention is embodied in the present instance, by way of illustration, in an optical measuring instrument adapted to be held in the hand and applied directly to one surface of a wall or plate of glass or other transparent material and to indicate directly to the eye of the observer the thickness of the plate to be measured, the measurement being thus made entirely from one side of the plate by means of the relative displacement of light rays from that side or surface, and from the opposite side or surface of the plate respectively. In the present instance also, for purposes of simplicity, the image of a measuring scale is projected on and reflected from the respective surfaces, so that the displacement of one reflected image of the scale relative to the other reflected image of the same may be read directly in turns of the graduations of the latter.

Referring more particularly to the drawings, Figs. 1 to 7 inclusive, there is shown a frame or casing indicated generally at 20 comprising a light projecting portion and an observation portion or sight tube. The projecting portion, in the present instance, is in the form of a tube or bore 21. The casing 20 is adapted to be held in the hand and applied directly to a body to be measured, as for example a curved plate 21 which may be the glass wall of an electric light bulb. For this purpose frame 20 is provided with three or more spaced contacts or feet 22 all of which are made to rest upon one side of the plate to position the instrument for use in proper relation with a suitable source of light as will be hereinafter described. The bracket 22$^a$ is provided as a rest for the band in gripping the instrument and as a stop to prevent interference by the band with the path of light through the projecting portion.

The light projecting portion of the instrument in the present instance is in the form of a tube or bore 23 formed in the frame 20 as shown, the axis of this light projecting tube being inclined to direct a beam of light against the surfaces of the plate to be measured at a suitable angle for producing spaced reflections from the respective faces of the plate as will be hereinafter described. The light projecting device or tube is provided with a diaphragm having light obstructing and light transmitting portions for projecting a beam of predetermined form. While this diaphragm may have various constructions it has been found that it may advantageously comprise the measuring scale itself, so that the latter may be projected and reflected from the optical surfaces for giving in a simple and convenient manner a direct reading of the distance between such surfaces. Accordingly the diaphragm is constructed in the present instance of two discs of glass, each partially silvered to provide a separating edge or reference line and also a scale which is cut through the silver film on one of the discs. Such a disc is shown at 24 (Figs. 3 and 4) having one portion 25 silvered and one portion 26 left transparent. A second disc 27 (Figs. 3 and 5) is employed having a silvered portion 28 and a transparent portion 29. These discs are placed together with their silvered portions protected therebetween, in the arrangement indicated in Fig. 6 from which it will be seen that the edge of the silvered portion 28 of the disc 27 forms a reference line 30, while the edge 31 of the silvered portion 25 of disc 24 has the silver film cut through or etched to provide a scale, graduations of which are numbered so that the separating edge 30 corresponds with the zero of the scale. The latter in the present instance is in terms of millimeters. This scale is shown in an illustrative way in the drawings, being constructed in practice with graduations indicating to a tenth of a millimeter.

The discs 24 and 27 are assembled as described in a mounting sleeve 32 threadedly fitted in the outer end of the projecting tube 23 as shown, the axis of the latter making in the present instance an angle of 45° with the plate to be measured. It will be apparent from the above construction that with the parts arranged as shown in Fig. 3 and projecting tube 23 properly turned toward a source of light, a beam of light in the form of an image of reference line 30 and scale 31 will be projected at an inclination through the opening of the lower end of the frame 20 against the plate to be measured. This image is reflected from the near surface of the plate at an angle of approximately 45° as shown, while a portion of the beam travels through the thickness of the glass and is reflected by the far surface of the plate, so that this beam 33 is finally reflected parallel with the reflected beam 34, but in spaced relation with the latter due to its different path through the glass. The distance of separation of the beams or images thus reflected from the respective surfaces of the plate depends of course, upon the refractive index of the glass. Since the variation of the refractive indices of glass ordinarily used for various commercial purposes is practically negligible, the separation of the reflected images is a function of and proportional to the distance between the two reflecting surfaces, this distance of separation being read through the observation means of the instrument.

The observation portion of the instrument comprises preferably a sight tube 35 formed on the frame as shown for observing the reflected scale images represented by the rays 33 and 34. This tube is provided with magnifying means, such, for example, as the plano-convex lens 36 mounted at the inner end of an adjustable sleeve 37, the outer end of which carries the eyepiece 38. It will be noted that the lens 36 has a substantial focal length which is desirable for facilitating accommodation of the eye to the slight inaccuracies of focus due to the different paths traversed by the images as viewed at the eyepiece 38.

Fig. 7 illustrates a view through the eyepiece of the instrument in use. The darkest portion of the field corresponds with the obstruction of the light by the silvered portions of the discs 24 and 27. The portion 39 of the field adjacent the separating edge 30 corresponds with the reflection of the scale image from the near surface of the plate to be measured. It will be noted that this portion 39 is of intermediate intensity of illumination. The portion 40 of the field corresponds with the reflection of the scale image from the far surface of the plate, the separating edge having the position 40$^a$ in this reflection. The portion 40 is of maximum intensity of illumination corresponding to the effect of the superposition of the two reflections. The reflection from the far surface of the plate includes the scale image which is visibly superposed over the scale of the reflection from the near surface. The position of the zero of the scale reflected from the far surface, and also of the corresponding separating edge 40$^a$ relative to the scale reflected from the near surface, indicates the distance between the reflected images in terms of the thickness of the plate, which is thus read directly on the scale of the reflection from the near surface where it is intersected by the separating edge 40$^a$. Thus the reading as shown in Fig. 7 is approximately two and eight-tenths millimeters, which is the thickness of the glass plate.

In Fig. 8 is shown another form of embodiment of the invention in which the sight tube, instead of being inclined as shown in Figs. 1 to 3, is arranged to extend vertically as may be found more convenient in use. To accomplish this result the sight tube is provided with a prism 41 mounted on a suitable inclined portion 42 of the instrument frame and held in position as by means of a screw 43. A light beam indicated at 44 passing through the projecting tube portion with its scale diaphragm 45 is reflected from the near and far surfaces of the glass plate 46 as indicated at 47 and 48 respectively. These reflected beams pass through the prism by which they are deflected, as well understood in the art, so that the beams are then directed vertically as at 49 and 50 respectively through the vertical sight tube 51.

Another form of embodiment of the invention is shown in Figs. 9 and 10, which has certain advantages, as for example in the measurement of the thickness of a lamp bulb 52 having an inner frosted surface 53. In this embodiment the projecting tube portion is provided with lens means for focusing the projected scale image on the surfaces of the wall to be measured, to increase the intensity of the reflections as particularly desirable where a reflection is to be obtained from a frosted surface. Thus the projecting tube portion is shown at 54 as of substantial length, being inclined as before and carried in a unitary frame or casing 55. Adjustably mounted in the other end of tube 54 is a sleeve 56 into the outer end of which is threaded a mounting 57 carrying the scale diaphragm 58 which is constructed as above described. The sleeve 56 slides longitudinally in tube 54 and is adjusted therein by means of a set screw 59 carried by the sleeve and sliding in a slot in the tube. The lens means is indicated at 60 and may have any suitable form, being mounted in a sleeve 61 sliding longitudinally in tube 54 for focusing purposes. The lens sleeve or mounting 61 is adjusted and secured in position by means of a clamp screw 62 carried by it and sliding in a slot in the tube 54. These parts are so constructed and arranged as to focus the image of the measuring scale of diaphragm 58 against the surfaces of the plate or wall 52 to be measured and at a suitable inclination for producing effective separated reflections from the same.

The instrument frame 55 comprises as before, a sight tube 63 of the vertical form described above in connection with Fig. 8, and provided with a prism 64 and with magnifying lens means 65. The reflections from the near and remote surfaces of the body to be measured are indicated diagrammatically at 66 and 67 respectively and are deflected upwardly by the prism 64 through the sight tube. The reflected images of the scale are magnified by a lens 65 and appear at the eyepiece as offset or spaced, one from the other, as previously described in connection with Fig. 7, so that the displacement of the separating edge or corresponding zero of one scale reflection indicates directly on the other scale reflection the required thickness of the body 52.

As previously explained, the refractive index of a glass ordinarily used for a given commercial purpose may be regarded, for practical purposes, as a constant, so that the instrument may be calibrated for use with glass of a given index and hence made to read with ample accuracy for commercial work, and of course, an instrument may be calibrated for use with glass of any special index of refraction. The invention thus provides a simple, practical and convenient means for rapidly measuring the thickness of transparent walls or plates of glass and the like, requiring access to but one side of the same, as particularly advantageous in measuring the walls of chemical glass ware and the like, or of a closed body such as a lamp bulb. The instrument furthermore affords direct indication of the thickness in terms of a desired unit of measure, so that but a single reading is necessary to obtain a desired thickness, and all computations, with their waste of time and chance of error are eliminated.

I claim as my invention:

1. An optical measuring instrument comprising means for directing a light beam to produce reflections thereof from different optical surfaces of an interposed body, and a scale designed and located for observation in conjunction with both of said reflections simultaneously to measure the distance between said reflections as a function of the distance between said optical surfaces.

2. An optical measuring instrument comprising means for directing a light beam to produce reflections thereof from different optical surfaces of an interposed body, a sight tube provided with magnifying lens means, and a scale designed and located for observation in conjunction with both of said reflections simultaneously for measuring the distance between said reflections as a function of the distance between said optical surfaces.

3. An instrument of the class described for measuring the distance between spaced optical surfaces of a body comprising a tube portion for cooperation with a source of light for directing a light beam to produce spaced reflections thereof from said optical surfaces, respectively, a sight tube portion provided with magnifying lens means, and a scale designed and located for observation in conjunction with both of said reflections simultaneously through said sight tube portion for measuring the distance between said reflections as a function of the distance between said optical surfaces.

4. An instrument of the class described for measuring the distance between spaced optical surfaces of a body comprising means for directing a light beam against said surfaces at an angle adapted to produce spaced reflections therefrom, respectively, sight tube means arranged for observing both of said reflections simultaneously and a scale arranged for observation simultaneously with both of said reflections to measure the distance between the latter as a function of the distance between said surfaces.

5. An instrument of the class described for measuring the distance between spaced optical surfaces of a body comprising a tube for cooperation with a source of light having a diaphragm provided with light obstructing and light transmitting portions for directing a light beam of predetermined form to produce spaced reflections thereof from said optical surfaces, respectively, a sight tube arranged for observing both of said reflections simultaneously, and a scale arranged for observation simultaneously with both of said reflections to measure the distance therebetween as a function of the distance between said surfaces.

6. An instrument of the class described for measuring the distance between spaced optical surfaces of a body comprising a tube for cooperation with a source of light having a diaphragm provided with light obstructing and light transmitting portions, and having also lens means positioned to receive light rays pasing through said diaphragm for directing and focusing a light beam of predetermined form to produce spaced reflections thereof from said optical surfaces, respectively, a sight tube provided with magnifying lens means, and a scale designed and located for observation in conjunction with both of said reflections simultaneously for measuring the distance therebetween.

7. An instrument of the class described for measuring the distance between spaced optical surfaces of a body comprising a device for cooperation with a source of light provided with means for projecting an image of a scale to produce spaced reflections thereof from said optical surfaces respectively, and a sight tube for observing the displacement of one of said scale images relative to the other as an indication of the distance between said optical surfaces.

8. An instrument of the class described for measuring the distance between opposite surfaces of a transparent body conprising a device for cooperation with a source of light and provided with means for projecting an image of a scale against said surfaces at an angle adapted to produce spaced reflections therefrom respectively, and a sight tube provided with magnifying lens means arranged for observing said scale reflections and the displacement of one relative to the other as an indication of the distance between said surfaces.

9. An instrument of the class described for measuring the distance between opposite surfaces of a transparent body comprising a device for cooperation with a source of light and provided with a diaphragm marked with a scale for projecting an image thereof to produce spaced reflections of said scale image from said surfaces respectively, and a sight tube provided with magnifying lens means for observing the displacement of one of said reflected scale images relative to the other, as an indication of the distance between said surfaces.

10. An instrument of the class described for measuring the distance between the opposite surfaces of a transparent body comprising a device for cooperation with a source of light and having a diaphragm marked with a scale and also lens means for projecting and focusing an image of said scale against said surfaces at an angle adapted to produce spaced reflections therefrom respectively, and a sight tube provided with magnifying lens means arranged for observing said reflected scale images and the displacement of one relative to the other, as an indication of the distance between said optical surfaces.

11. An instrument of the class described for measuring the distance between opposite surfaces of a transparent body comprising a device for cooperation with a source of light and having means provided with a scale and also lens means for projecting an image of said scale against said surfaces at an angle adapted to produce spaced reflections of the same therefrom respectively, prism means for deflecting the reflected beams and magnifying lens means for observing the reflected images of said scale and the displacement of one relative to the other to indicate the distance between said optical surfaces.

12. An instrument of the class described for measuring the distance between opposite surfaces of a transparent body comprising a diaphragm provided with light obstructing and light transmitting portions, lens means positioned to receive light rays passing through said diaphragm and for projecting and focusing a light beam of predetermined form against said surfaces at an angle adapted to produce spaced reflections therefrom, respectively, and a sight tube provided with magnifying lens means of substantial focal length for simultaneously observing both of said reflections and the relative displacement therebetween as an indication of the distance between said surfaces.

13. In an optical measuring instrument, a frame provided with a plurality of contacts for application to a body to be measured to position the instrument thereon, means for directing a light beam to produce reflections thereof from different optical surfaces of said body, and a scale arranged for observation in conjunction with said reflections to measure the distance between said reflections as an indication of the distance between said optical surfaces.

14. In an instrument for measuring the distance between spaced optical surfaces of a body, a frame provided with a plurality of spaced contacts for engagement with one surface of a body to be measured to position the instrument relative thereto, a tube portion on said frame for cooperation with a source of light for directing a light beam to produce spaced reflections thereof from said optical surfaces respectively, a sight tube portion on said frame provided with magnifying lens means, and a scale arranged for observation through said sight tube in conjunction with said reflections for measuring the distance between said reflections as a function of the distance between said optical surfaces.

15. In an instrument of the class described for measuring the distance between spaced optical surfaces of a body, a frame provided with means for contact with said body to space the instrument relative thereto, a device on said frame for cooperation with a source of light provided with means for projecting an image of a scale to produce spaced reflections thereof from said optical surfaces respectively, and a sight tube on said frame for observing the displacement of one of said scale images relative to the other as an indication of the distance between said optical surfaces.

16. In an instrument for measuring the distance between opposite surfaces of a transparent body, a frame provided with means for contact with the surface of said body to space the instrument therefrom, a device on said frame for cooperation with a source of light provided with means for projecting an image of a measuring scale against said surfaces at an angle adapted to produce spaced reflections therefrom respectively and a sight tube on said frame provided with magnifying lens means arranged for observing said reflected scale images and the displacement of one relative to another, to afford a direct reading on one of said scales of the required distance between said optical surfaces.

GEORGE B. GALLASCH.